US012670049B2

(12) United States Patent
Wang et al.

(10) Patent No.: US 12,670,049 B2
(45) Date of Patent: Jun. 30, 2026

(54) INTELLIGENT MANAGEMENT OF CLOUD SERVICES

(71) Applicant: SAP SE, Walldorf (DE)

(72) Inventors: Yu Wang, Xi'an (CN); Le Zhang, Xi'an (CN); Moritz Semler, Spechbach (DE); Haoxing Hou, Xi'an (CN); Daping Wang, Xi'an (CN)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 18/520,412

(22) Filed: Nov. 27, 2023

(65) Prior Publication Data

US 2025/0173204 A1      May 29, 2025

(51) Int. Cl.
| | |
|---|---|
| *G06F 11/07* | (2006.01) |
| *G06F 11/14* | (2026.01) |
| *G06F 11/30* | (2006.01) |
| *H04L 45/02* | (2022.01) |

(52) U.S. Cl.
CPC ...... *G06F 11/0709* (2013.01); *G06F 11/1438* (2013.01); *G06F 11/3006* (2013.01); *H04L 45/02* (2013.01)

(58) Field of Classification Search
CPC ............. G06F 11/0709; G06F 11/1438; G06F 11/3006; H04L 45/02
See application file for complete search history.

(56) References Cited

U.S. PATENT DOCUMENTS

| | | | | |
|---|---|---|---|---|
| 8,949,669 | B1 * | 2/2015 | Khokhar | G06F 11/0727 714/48 |
| 10,432,661 | B2 * | 10/2019 | Vasseur | H04L 63/1425 |
| 11,675,648 | B2 * | 6/2023 | Chen | G06F 11/0754 714/38.1 |
| 11,775,401 | B1 * | 10/2023 | Kailasa | G06F 11/2094 714/4.11 |
| 2016/0254943 | A1 * | 9/2016 | Maes | H04L 41/0668 709/224 |
| 2017/0330096 | A1 * | 11/2017 | Das Gupta | G06F 11/3409 |
| 2022/0382620 | A1 * | 12/2022 | Bramble | G06F 11/0787 |

* cited by examiner

*Primary Examiner* — Bryce P Bonzo
*Assistant Examiner* — Xinyuan Yu
(74) *Attorney, Agent, or Firm* — Mintz Levin Cohn Ferris Glovsky and Popeo, P.C.

(57) ABSTRACT

There provided is a method for managing cloud service, wherein the method include detecting, at client nodes, anomalies based on a predetermined set of rules; determining, by the client nodes, whether to upload one or more anomalies of the detected anomalies to a topology aggregation service, in response to a decision not to upload the one or more anomalies to the topology aggregation service, automatically selecting an action from a plurality of available actions, by the client nodes, wherein the action is selected based at least in part on the service level associated with the entity that is experiencing the one or more anomalies, and undertaking the selected action; and in response to a decision to upload the one or more anomalies to the topology aggregation service, transmitting the one or more anomalies to the topology aggregation service.

20 Claims, 9 Drawing Sheets

500

Detecting, at client nodes, anomalies based on a predetermined set of rules 502

Determining, by the client nodes, whether to upload one or more anomalies of the detected anomalies to a topology aggregation service based at least in part on a severity level associated with the one or more anomalies and/or a service level associated with an entity that is experiencing the one or more anomalies 504

In response to a decision not to upload the one or more anomalies to the topology aggregation service, automatically selecting an action from a plurality of available actions, and undertaking the selected action 506

In response to a decision to upload the one or more anomalies to the topology aggregation service, transmitting the one or more anomalies to the topology aggregation service 508

380

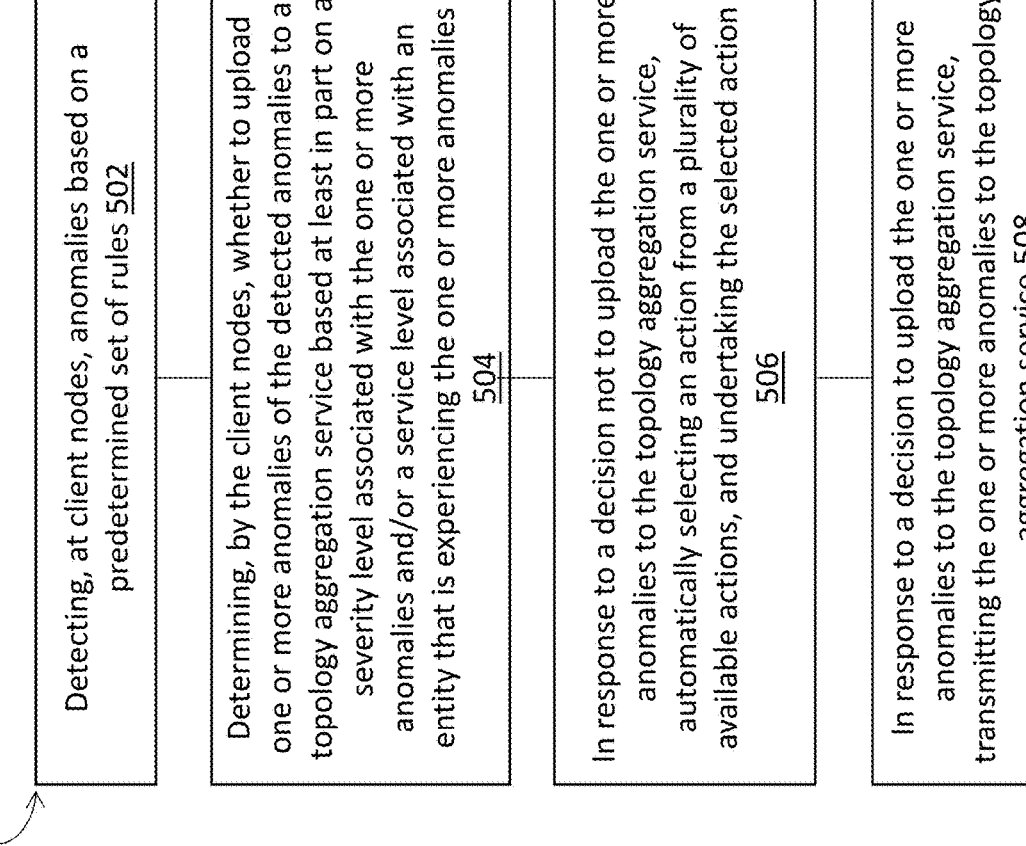

Detecting, at client nodes, anomalies based on a predetermined set of rules 502

Determining, by the client nodes, whether to upload one or more anomalies of the detected anomalies to a topology aggregation service based at least in part on a severity level associated with the one or more anomalies and/or a service level associated with an entity that is experiencing the one or more anomalies 504

In response to a decision not to upload the one or more anomalies to the topology aggregation service, automatically selecting an action from a plurality of available actions, and undertaking the selected action 506

In response to a decision to upload the one or more anomalies to the topology aggregation service, transmitting the one or more anomalies to the topology aggregation service 508

INTELLIGENT MANAGEMENT OF CLOUD SERVICES

TECHNICAL FIELD

The subject matter described herein relates generally to cloud services and more specifically to anomaly detection and management in cloud services.

BACKGROUND

Cloud services have become an integral part of modern computing infrastructure, providing a range of services from data storage to computational power. These services are often managed and maintained by distributed agents or client nodes, which may be partially responsible for monitoring the health and performance of the cloud service.

SUMMARY

Systems, methods, and articles of manufacture, including computer program products, are provided for cloud services management. In one aspect, there is provided a system. The system may include at least one data processor and at least one memory. The at least one memory may store instructions that result in operations when executed by the at least one data processor. The operations may include: detecting, at client nodes, anomalies based on a predetermined set of rules; determining, by the client nodes, whether to upload one or more anomalies of the detected anomalies to a topology aggregation service, wherein the determining is based at least in part on a severity level associated with the one or more anomalies and/or a service level associated with an entity that is experiencing the one or more anomalies; in response to a decision not to upload the one or more anomalies to the topology aggregation service, automatically selecting an action from a plurality of available actions, by the client nodes, wherein the action is selected based at least in part on the service level associated with the entity that is experiencing the one or more anomalies, and undertaking the selected action; and in response to a decision to upload the one or more anomalies to the topology aggregation service, transmitting the one or more anomalies to the topology aggregation service.

A computer-implemented method may include: detecting, at client nodes, anomalies based on a predetermined set of rules; determining, by the client nodes, whether to upload one or more anomalies of the detected anomalies to a topology aggregation service, wherein the determining is based at least in part on a severity level associated with the one or more anomalies and/or a service level associated with an entity that is experiencing the one or more anomalies; in response to a decision not to upload the one or more anomalies to the topology aggregation service, automatically selecting an action from a plurality of available actions, by the client nodes, wherein the action is selected based at least in part on the service level associated with the entity that is experiencing the one or more anomalies, and undertaking the selected action; and in response to a decision to upload the one or more anomalies to the topology aggregation service, transmitting the one or more anomalies to the topology aggregation service.

A non-transitory computer-readable medium storing instructions, which when executed by at least one data processor, result in operations including: detecting, at client nodes, anomalies based on a predetermined set of rules; determining, by the client nodes, whether to upload one or more anomalies of the detected anomalies to a topology aggregation service, wherein the determining is based at least in part on a severity level associated with the one or more anomalies and/or a service level associated with an entity that is experiencing the one or more anomalies; in response to a decision not to upload the one or more anomalies to the topology aggregation service, automatically selecting an action from a plurality of available actions, by the client nodes, wherein the action is selected based at least in part on the service level associated with the entity that is experiencing the one or more anomalies, and undertaking the selected action; and in response to a decision to upload the one or more anomalies to the topology aggregation service, transmitting the one or more anomalies to the topology aggregation service.

In some variations of the methods, systems, and non-transitory computer readable media, one or more of the following features can optionally be included in any feasible combination.

In some variations, the available actions comprise one or more of abortion, interruption, replacement, retry, and isolation.

In some variations, the operations further comprise: transmitting the uploaded one or more anomalies from the topology aggregation service to a conductor; prioritizing, by the conductor, the uploaded one or more anomalies based on one or more of severity levels, contagious levels, historical data, computational power associated with the uploaded one or more anomalies; generating, by an auto-remediate service, proposed solutions to the uploaded one or more anomalies; and propagating the proposed solutions to the client nodes.

In some variations, the auto-remediate service further comprises an auto-adaptive thresholds operation, the auto-adaptive thresholds operation detecting, in real-time or near real-time, whether one or more of the operations corresponding to the proposed solutions is available.

In some variations, the client nodes further comprise an assembly estimated scaler, the assembly estimated scaler providing the available actions for the client nodes to deploy in a predetermined order.

In some variations, the topology aggregation service comprises an indexed assembly triplet, the indexed assembly triplet comprising an error severity level, an original service associated with the error, and a potential operation list associated with the anomaly.

In some variations, the determining of whether to upload the anomaly is based at least in part on a quality or cost associated with the service level.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a flowchart diagram illustrating a process for anomaly detection and management in a cloud service, consistent with implementations of the current subject matter.

When practical, similar reference numbers denote similar structures, features, or elements.

DETAILED DESCRIPTION

Figure 1:
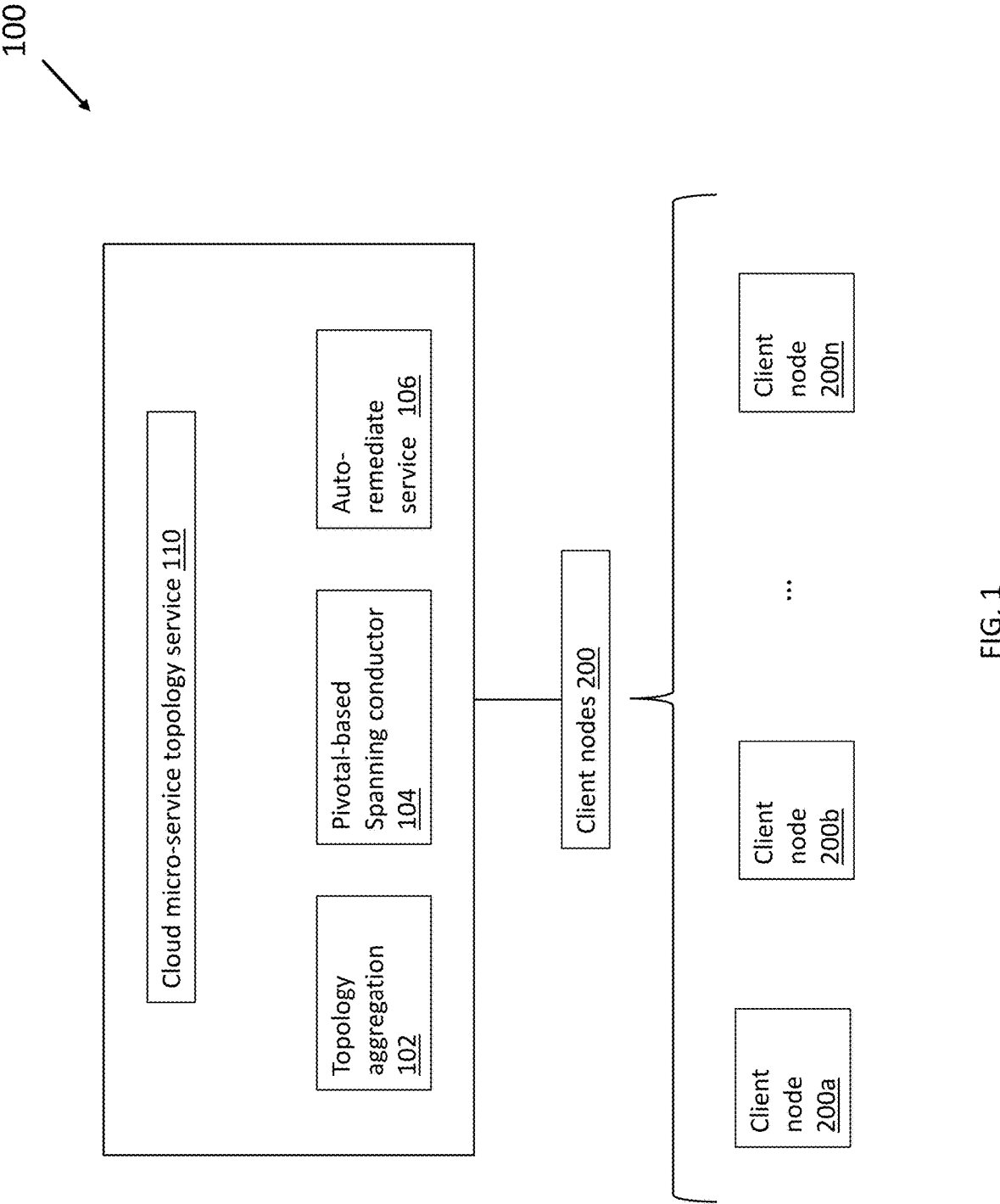
FIG. 1 depicts a block diagram illustrating a system for anomaly detection and management in a cloud service, in accordance with some example embodiments.

As discussed herein, cloud services have become an integral part of modern computing infrastructure, providing a range of services from data storage to computational power. These services may be maintained by client nodes, which may be responsible for, or partially responsible for monitoring the health and performance of the cloud service. These client nodes may include distributed agents of the cloud service, etc., and the client nodes may detect anomalies in the service, for example, based on a predetermined set of rules.

Anomalies in a cloud service can range from minor issues, such as a slight drop in performance, to major problems, such as a complete service outage. The severity of these anomalies can vary greatly. It is advantageous for the client nodes to generate suitable responses to at least a portion of these anomalies. By doing so, the system may conserve computational resources, as it eliminates the requisite to upload all anomalies to the cloud side. The responses can include a variety of actions, such as aborting a task, interrupting a service, replacing a component and or a service, retrying an operation, or isolating a problem area.

Service Level Agreements (SLAs) may be utilized in the management of cloud services. These agreements may define the service level expected by the client (e.g., a customer) of cloud services, and may include provisions for quality and cost. The SLA service level can sometimes influence the actions taken by the client nodes in response to detected anomalies. In some embodiments, Service Level Objective (SLO) may be part of a service level agreement (SLA), and may define a specific goal that the service provider aims to achieve in terms of the quality and performance of the service they provide. SLO and/or SLA may be measured by metrics like uptime, response time, and error rates, etc. In some embodiments, SLOs may be used to set clear expectations for service performance and to establish benchmarks for measuring and managing the service quality. The service level associated with an entity may be unitized to provide suitable remedial actions to one or more anomalies it is experiencing.

In some embodiments, topology aggregation services may be utilized in the management of cloud services. These services may provide consolidations and simplifications of topological data to create an overview of the network's structure and interconnections. In some embodiments, these services may collect and aggregate information about the topology of the cloud service, providing a comprehensive view of the service's structure and operation. This information may be used to help manage the service, identify potential problems, and plan for future growth and development.

In some embodiments, there is provided systems and methods for intelligent management of cloud services. In some implementations, the systems and method may provide several benefits. Firstly, it does not require every detected anomaly to be uploaded to the topology aggregation service. This selective approach saves computational power and resources, making the system more efficient. Secondly, responses to anomalies are tailored based on the SLA service level associated with a client. This may ensure that different actions may be taken in response to an anomaly depending on the agreed service levels, ensuring that the response is appropriate and cost-effective.

FIG. 1 depicts a block diagram illustrating a system 100 for anomaly detection and management in a cloud service, in accordance with some example embodiments. As shown in FIG. 1, the system may provide an anomaly detecting and remedial operation mechanism on a cloud service (e.g., SAP's HANA Could or other type of cloud service). Given the increasing prominence of modern native cloud database environments in handling critical workloads and data lakes for enterprise customers—for example in the context of big data and hybrid multi-cloud resources—it becomes desirable to transition the operational paradigm towards a more efficient methodology for system performance evaluation, anomaly identification and remediation.

The system 100 may provide proactive monitoring, utilizing knowledge-based tracking to detect and address potential performance deteriorations or localized anomalies prior to any impact on external customers and stakeholders. Leveraging intelligent and flexible cloud resource management, the system provides a proactive and preemptive approach in its technical design, integrating various services and endpoint administrations within a dynamic service topology graph for cloud service management.

As shown in FIG. 1, the cloud micro-service topology service 110 may comprise service-side modules, engines, and/or functionalities, for example, the cloud micro-service topology service 110 may comprise micro-service topology aggregation 102, pivotal-based spanning conductor 104, and auto-remediate service 106. In some embodiments, a feature may be the micro-service topology aggregation 102 and/or the client nodes 200 (e.g., which may include cloud topology affinity scalers), which may collectively serve as a preliminary measure in the cloud monitoring service to pinpoint service endpoints exhibiting operational anomalies.

As shown in FIG. 1, the cloud micro-service topology service 110 and the client nodes 200 may coordinate with one another to perform functionalities described herein. In some embodiments, the client nodes 200 may be referred to as distributed agents, or cloud topology affinity scalers; those terminologies and concepts are used interchangeably throughout this application paper. As shown in FIG. 1, the client nodes 200 may be a collection of the client nodes 200*a*, 200*b*, . . . 200*n*, wherein each of the client nodes may operate separately. In some embodiments, historical operation tracking may show that sometimes, performance declines unexpectedly when the cloud environment workload is very high. Prior to executing failover protocols, the systems provide herein may aggregate affected service links. For example, such aggregation may employs indexing and correlation data structures, proactively cataloging associated services before further deterioration. Subsequent to this process, the system may isolate the affected service links to further segment and demarcate potential service disturbances within the service topology graph, facilitating more efficient self-repair mechanisms. In some embodiments, operations performed by the client nodes 200 may be described in further details in connection with FIG. 2A.

The pivotal-based spanning conductor 104 may be constructed around business scenarios and cloud resource management stipulations. For example, multiple SLO and/or SLA tiers may operate simultaneously across both public and hybrid cloud environments. In some embodiments, specific endpoints within a micro-service—a small, self-contained unit of a larger application designed to perform a specific function—may serve as crucial points within the broader workflow of services. These micro-service endpoints may be pivotal nodes that represent important stages in the entire service process, which may be visualized using clustering techniques and graphical representations. These pivotal nodes may take on various roles such as mediators, orchestrators, assemblers, and resource management agents, each characterized by their own performance standards and regulatory requirements. In some embodiments, the pivotal-based spanning conductor 104 may be customized to meet the specific Service Level Objectives (SLOs) and Service Level Agreements (SLAs) of different business clients. This pivotal-based spanning conductor 104 may use a variety of automated corrective actions and strategies for managing service quality.

In some embodiments, the pivotal-based spanning conductor 104 may be configured to assess and rank the importance of one or more detected anomalies. In some embodiments, this prioritization may be based on a variety of factors, which could include the severity of the anomalies, their potential to affect other parts of the system (contagious levels), any historical data regarding similar anomalies, and the amount of computational resources related to the anomalies. This process may ensure that the most critical issues are addressed promptly and effectively, optimizing the use of available resources and maintaining system stability. By taking into account the potential impact and the system's past experiences with such issues, the spanning conductor can make informed decisions about which anomalies to address first, leading to a more efficient and reliable system.

As shown in FIG. 1, the cloud micro-service topology service 110 may comprise an auto-remediate service 106, when integrated with the perceptive pivotal-based spanning conductor 104, attains comprehensive awareness of the conditions of affected service links within the service topology graph. In some embodiments, an auto-adaptive threshold mechanism may be introduced to facilitate the preemptive auto-remediation of service anomalies. In some embodiments, the auto-remediate service 106 may generate proposed solutions to one or more anomalies. For example, the solutions may include one or more operations the system may provide to address the one or more anomalies. In some embodiments, the auto-adaptive threshold may detect, in real time or near real-time, whether one or more of the operations of the proposed solution is available. For example, if an operation of one or more operations is not available, the auto-remediate service 106 may adjust the proposed solution to exclude the unavailable operations. This may ensure swift and accurate resolution strategies, such as tuning, retrying, aborting, or substituting, addressing internal anomalies prior to propagation to external enterprise client endpoints.

Figure 2A:
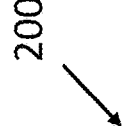
FIG. 2A depicts a block diagram illustrating a client node for facilitating anomaly detection and management in a cloud service, in accordance with some example embodiments.
Figure 2A:
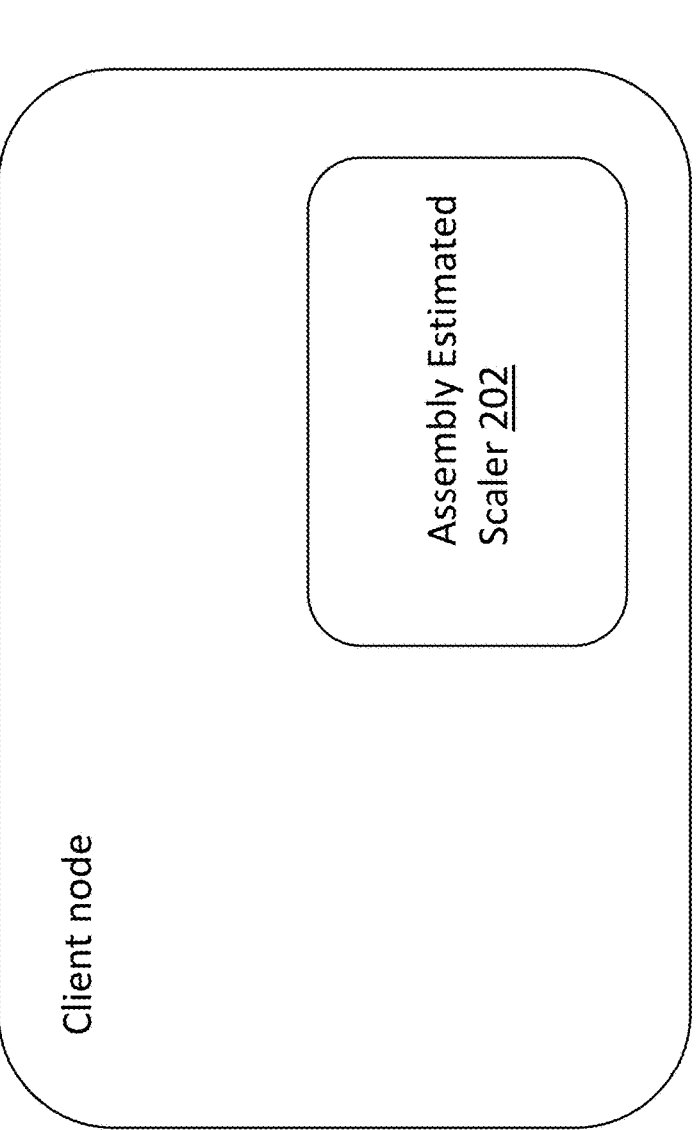

FIG. 2A depicts a block diagram illustrating a client node 200 for facilitating anomaly detection and management in a cloud service, in accordance with some example embodiments. In some embodiments, client node 200 may detect anomalies based on a predetermined set of rules, and may determine whether to upload the detected anomalies to a topology aggregation service (e.g., topology aggregation 102). In some embodiments, the client node 200 may determine whether to upload one or more anomalies of the detected anomalies to a topology aggregation service based on a severity level associated with the one or more anomalies. In some embodiments, the client node 200 may determine whether to upload one or more anomalies of the detected anomalies to a topology aggregation service based on a service level associated with an entity that is experiencing the one or more anomalies, wherein the service level may be a SLA service level. In some embodiments, if the determined action is not to upload the detected anomalies, then the client node 102 may automatically select an action from the available actions to address the anomalies and undertake the selected action. In some embodiments, the client nodes may select the action based on the service level associated with the entity that is experiencing the anomalies. In some embodiments, the available actions may include abortion, interruption, replacement, retry, and isolation. In some embodiments, if the client node 200 determines to upload the detected anomalies, it may transmit the anomalies to the topology aggregation service for further processing.

As shown in FIG. 2A, a client node 200 may comprise an assembly estimated scaler 202. In some embodiments, the assembly estimated scaler 202 is a specialized component designed to provide the client node with a set of available actions that can be deployed in response to detected anomalies. These actions are determined based on a variety of factors, including the nature and severity of the anomaly, the potential impact on the cloud service, and the Service Level Agreement (SLA) level associated with the client (i.e., entity). The assembly estimated scaler 202 may operate by analyzing these factors and generating a list of potential actions. This list is then ordered in a predetermined manner, i.e., in a predetermined order, based on the expected effectiveness of each action in addressing the anomaly and mitigating its impact on the cloud service. The order of the actions may also take into account other considerations, such as the cost associated with each action and the potential disruption to the cloud service. Once the assembly estimated scaler 202 has generated and ordered the list of available actions, it may provide this list to the client node 200. The client node 200 may then select an action from the list and deploy it in response to the anomaly. This selection process may be guided by the SLA level associated with the client, ensuring that the chosen action aligns with the agreed-upon service levels and cost constraints. Through the combined efforts of the client nodes and the assembly estimated scaler, the system is able to manage anomalies in a dynamic and intelligent manner. This contributes to the efficient and effective operation of the cloud service, ensuring that it continues to meet the expectations of the client and adhere to the terms of the SLA.

Figure 2B:
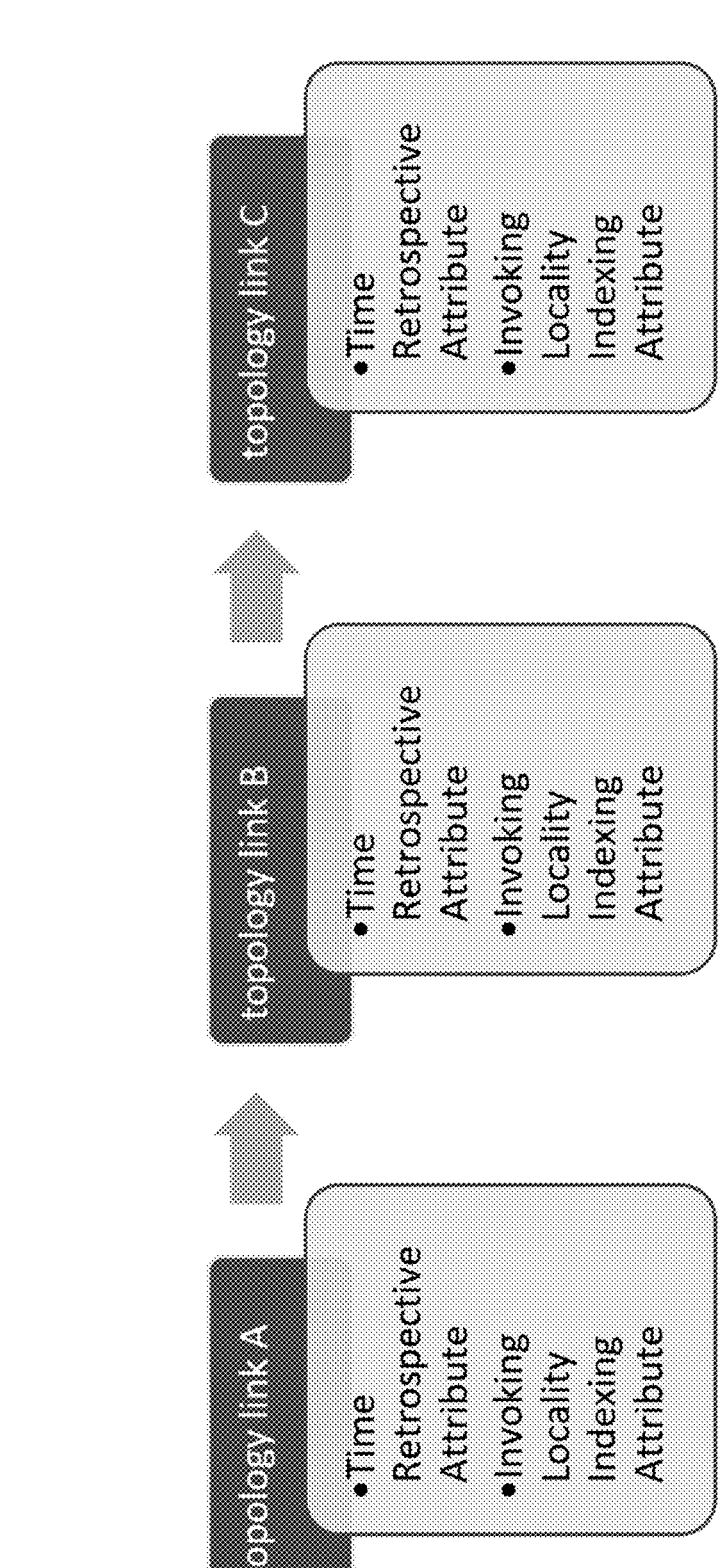
FIG. 2B depicts a diagram illustrating data structures facilitating anomaly detection and management in a cloud service, in accordance with some example embodiments.

FIG. 2B depicts a diagram illustrating data structures 250 facilitating anomaly detection and management in a cloud service, in accordance with some example embodiments. In some embodiments, the data structures 250 may include an indexing-based topology and service dependency links, which be utilized to aid the micro-service topology aggregator. In addition to the service topology and dependency linked data, two additional data structures may be appended to expedite the aggregation result. The first of these may be the time retrospective attribute, which serves as a time-anchor for recent invocations of the micro-service stack. This attribute may be employed to capture historical invoking experiences in the cloud context, for example when an intrinsic retry mechanism is triggered, indicating that a potential anomaly or performance issue may occur from the operational area. This attribute may be incorporated as one of the indexing stubs, which can accelerate the identification of time-locality topology risks and anomalies in a proactive manner. It can also facilitate a more efficient horizontal comparison between adjacent service invocations in a time-based manner. The second additional data structure is the invoking locality indexing attribute, which serves as an intelligent invoking-similarity anchor for invoking the micro-service stack over a longer term relative to the time retrospective attribute. This attribute records the invoking service lineage information, using the micro-service invoking ID and topology ID along with the similarity computing result. To facilitate potential invoking stack similarity comparisons and indexing buffering, the related attribute data are managed in a ring-based linked-queue data structure. This means that as more similar invoking service stacks are added, less similar stack data will be removed. As a result, the size of the queue will indicate the overall system agility for service compliance with different Service Level Objectives (SLOs) and Service Level Agreements (SLAs), allowing for auto-remediation accordingly.

Figure 3A:
FIG. 3A depicts a block diagram illustrating a system for anomaly detection and management in a cloud service, in accordance with some example embodiments.
Figure 3A:
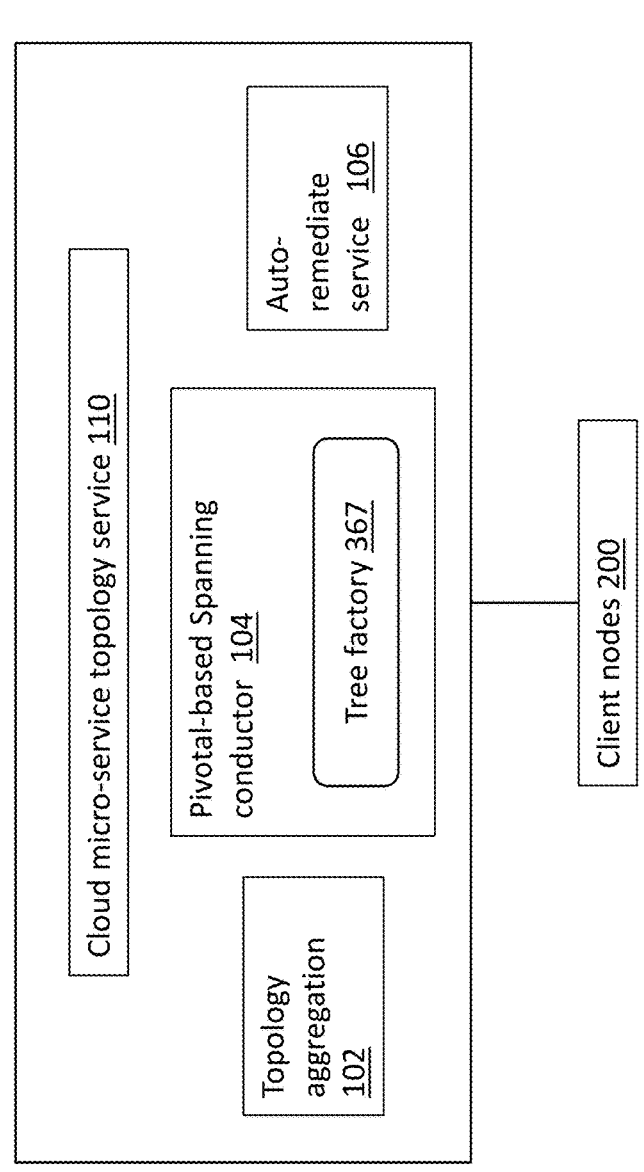

FIG. 3A depicts a block diagram illustrating a system 300 for anomaly detection and management in a cloud service, in accordance with some example embodiments. As shown in FIG. 3, the pivotal-based spanning conductor 104 may further comprise a tree factory 367, for example, a linked spanning tree factory. The tree factory 367 may be a component designed to generate and manage a tree-like data structure that represents the relationships and dependencies between different elements of the cloud service. This tree structure, known as a spanning tree, is linked, meaning that each node in the tree is connected to at least one other node. The linked spanning tree factory operates by analyzing the cloud service's topology and the interactions between its various components. Based on this analysis, it generates a spanning tree that accurately represents the service's structure and operation. This tree factory 367 can then be used to guide the anomaly detection and management process, helping to identify potential issues and devise appropriate remedial actions. The linked spanning tree factory 367 is a dynamic component, capable of updating the spanning tree in real-time or near real-time as the state of the cloud service changes. This may ensure that the spanning tree remains accurate and up-to-date, reflecting the current state of the cloud service and providing a reliable basis for anomaly detection and management. In some implementations, the linked spanning tree factory may also include additional features or functionalities to enhance its performance and utility. These could include, for example, optimization algorithms to improve the efficiency of the tree generation process, or visualization tools to help users understand and interpret the spanning tree.

Figure 3B:
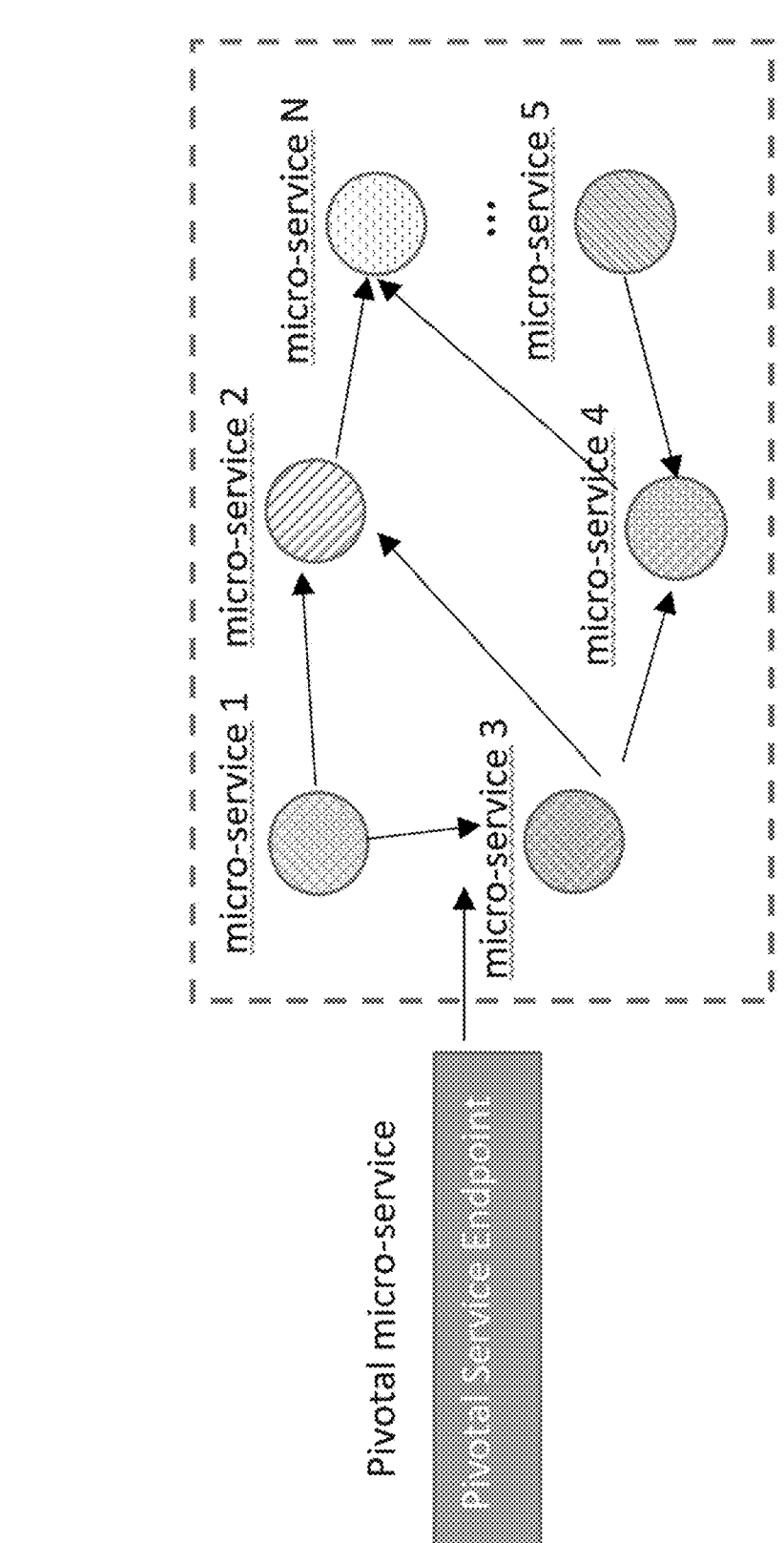
FIG. 3B depicts a diagram illustrating data structures facilitating anomaly detection and management in a cloud service, in accordance with some example embodiments.

FIG. 3B depicts a diagram illustrating data structures 330 facilitating anomaly detection and management in a cloud service, in accordance with some example embodiments. As shown in FIG. 3B, the generative pivotal-based induced sub-graph plays a pivotal role in the context of the perceptive pivotal-based spanning conductor. The micro-service topology aggregation 102 may generate the related indexing-based topology and service dependency links. These data structures and related outputs play their own roles in illustrating the correlated relationships and related monitoring data when potential risks or issues occur in the perspective of the existing service topology and dependency graph. The sub-graph may be tailored for pivotal-based service endpoint dependency reconstruction and regeneration for any potential and internal performance adjustment. The generative pivotal-based induced sub-graph may be extracted from the original topology graph, for example, creating a sub-domain of the corresponding service dependency relationships. In some embodiments, reconstructing the branches and leaves based on the evaluated indexing value may be utilized. As a result, the shape and traversal of the sub-graph are not the same as from the original graph. If the original topology graph is referred to as the service invoking graph, the newly generated sub-graph may be referred to as the "auto-remediate runtime sub-graph". The induced attribute of the sub-graph ensures that the composite relation edges are stored from the original topology graph, with the sequence and ranking order adjusted for remediate speeding up and reference indexing. This dynamic and intelligent data structure contributes to the efficient and effective operation of the cloud service, ensuring that it continues to meet the expectations of the client and adhere to the terms of the Service Level Agreement (SLA).

Figure 3C:
FIG. 3C depicts a block diagram illustrating a system for anomaly detection and management in a cloud service, in accordance with some example embodiments.
Figure 3C:
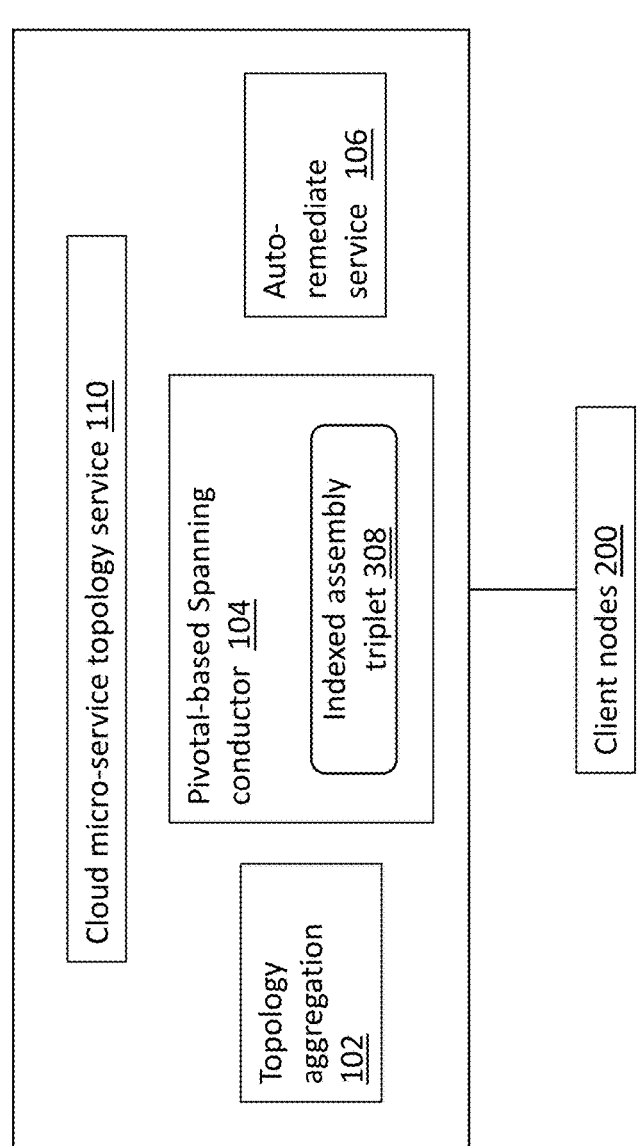

FIG. 3C depicts a block diagram illustrating a system 350 for anomaly detection and management in a cloud service, in accordance with some example embodiments. As shown in FIG. 3C, the pivotal-based spanning conductor 104 may further comprise an indexed assembly triplet 308. In some embodiments, the indexed assembly triplet 308 is a data structure that includes information about each anomaly that is uploaded to the service. It comprises three main elements: an error severity level, an original service associated with the error, and a potential operation list associated with the anomaly. The error severity level is a measure of the potential impact of the anomaly on the cloud service. It is determined based on a variety of factors, including the extent of the deviation from the expected behavior, the potential impact on the cloud service's performance, and the potential risk to the service's reliability or availability. The error severity level provides a quantitative assessment of the anomaly, allowing the topology aggregation service to prioritize the anomalies and allocate resources accordingly. The original service associated with the error refers to the specific component or operation of the cloud service that is implicated in the anomaly. This could be an exemplary process, a specific server, a database operation, or any other component or operation of the cloud service. Identifying the original service associated with the error provides valuable context for understanding the anomaly and devising appropriate remedial actions. The potential operation list associated with the anomaly is a set of actions or operations that could potentially address the anomaly. These operations are determined based on the nature of the anomaly, the original service associated with the error, and other relevant factors. The potential operation list provides a starting point for the auto-remediate service in generating proposed solutions to the anomaly. Through the indexed assembly triplet 308, the pivotal-based spanning conductor 104 is able to capture and organize detailed information about each anomaly. This information is used to guide the decision-making process, inform the generation of proposed solutions, and facilitate the efficient and effective management of the cloud service.

Figure 3D:
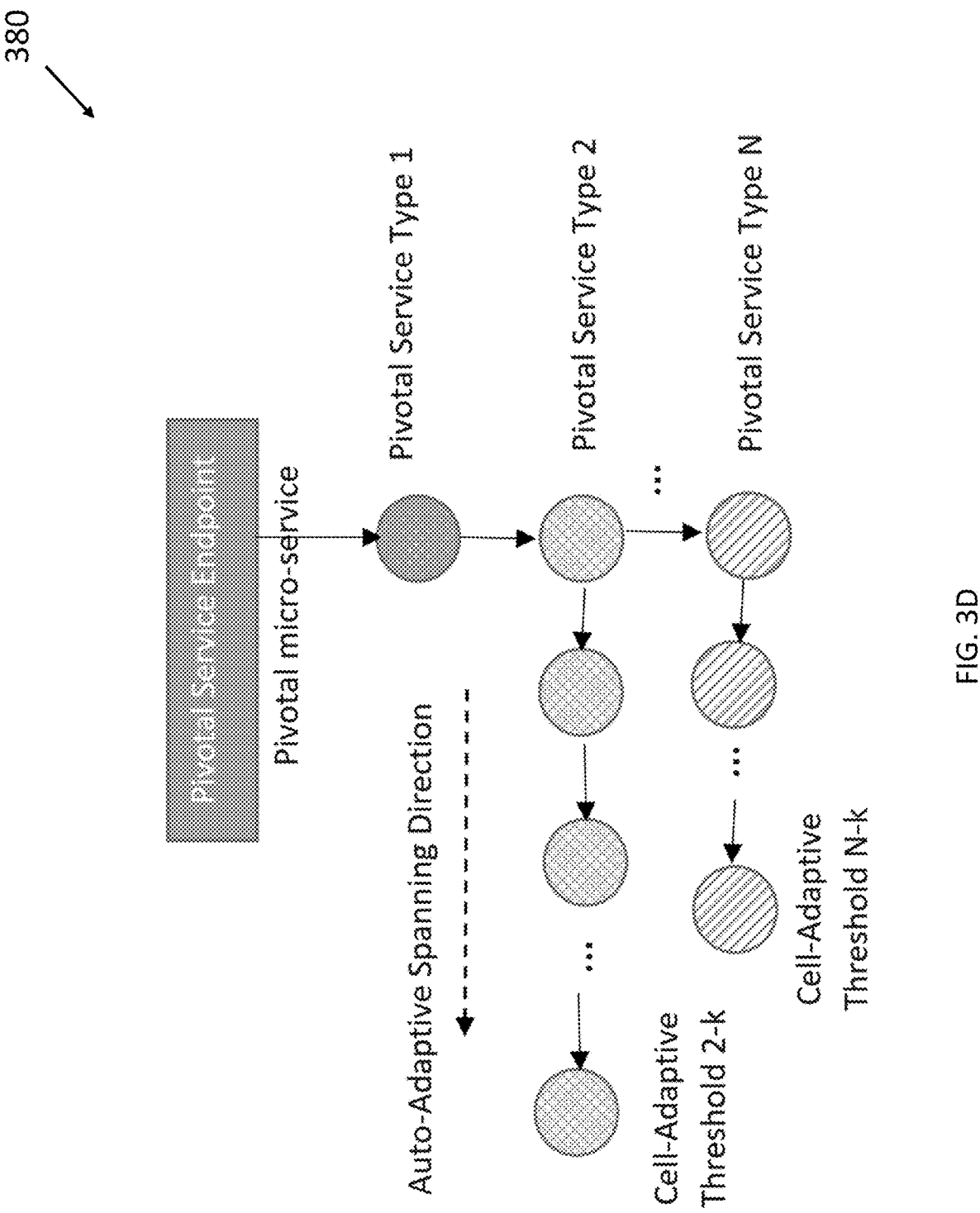
FIG. 3D depicts a diagram illustrating data structures facilitating anomaly detection and management in a cloud service, in accordance with some example embodiments.

FIG. 3D depicts a diagram illustrating data structures 380 facilitating anomaly detection and management in a cloud service, in accordance with some example embodiments. In some embodiments, the auto-adaptive threshold spanning tree plays a pivotal role when meeting the various requirements of service level objectives (SLO) and Service Level Agreements (SLA) related to micro-service invoking stack consumed by different enterprise customers with specified cloud resource configuration and deployment strategy. The auto-adaptive threshold is evaluated by different SLO and/or SLA micro-service provisioning when it's pre-defined or dynamically configured by cloud operation. It also distinguishes the extent and level of performance tuning, adjustment in parameter combination and collection sets, service downgrade scope management, and retry mechanism. As the longitude and extent of the threshold matrix could no longer be determined before system runtime, the intelligent and auto-adaptive threshold spanning tree is designed and introduced. From the overall customer configuration cube, the whole data structure is the spanning forest. From the single customer deployment and SLO and/or SLA service level compliance and related consumption, it's extracted and considered as the new approach of auto-adaptive threshold spanning tree. The root node of the tree is provided by the pivotal-based conductor. Along with the dynamic transformation of micro-service execution topology changes, the tree will grow and populate the related auto-adaptive threshold values to meet the service level compliance requirements. For example, if at a specific time t1, the storage volume of configured accounts triggered the quota amount, then the spanning tree will grow from left to right as the first node to notify the related routine for further operation. While the same storage-alert service received a similar type of message with a different service level with configured user identity, then the spanning tree will generate another branch along with a leaf with a newly generated auto-adaptive threshold to meet that account. The branches of the auto-adaptive threshold spanning tree could represent in a flexible manner like user identity, service spaces, account configuration scopes, and other metadata governance compliance. For the auto-remediate operations for native cloud and ops context, it could fully leverage the related information from the auto-adaptive threshold spanning tree. Mapping the remediate operators using rule-based repository mapping or machine learning feature provisioning for dynamic performance adjustment and tuning could be employed.

FIG. 5 depicts a flowchart diagram illustrating a process 500 for anomaly detection and management in a cloud service, consistent with implementations of the current subject matter. As shown in FIG. 5, the process may begin with operation 502, wherein the system may detect, at client nodes, anomalies based on a predetermined set of rules. In some embodiments, the predetermined set of rules may comprise parameters such as response times, error rates, or resource usage, designed to capture a wide range of potential issues that could affect the service's operation. These rules may be dynamic, adjusting in real-time or near real-time to the changing conditions of the cloud service. Following the detection of anomalies, the process 500 may proceed to operation 504, where the client nodes may determine whether to upload one or more anomalies of the detected anomalies to a topology aggregation service based at least in part on a severity level associated with the one or more anomalies and/or a service level associated with an entity that is experiencing the one or more anomalies. The severity level of an anomaly may be determined based on a variety of factors, including the extent of the deviation from the expected behavior, the potential impact on the cloud service's performance, and the potential risk to the service's reliability or availability. If the decision is made not to upload the anomaly to the topology aggregation service, the process 500 may proceed to operation 506, where the client nodes may automatically select an action from a plurality of available actions, and undertaking the selected action. In some embodiments, the action may be selected based on the service level associated with the entity that is experiencing the one or more anomalies, and undertaking the selected action. The service level may influence the actions taken by the distributed agents or client nodes in response to detected anomalies, ensuring that the management of the cloud service is aligned with the expectations of the client and the agreed-upon service levels. In some embodiments, these available actions can include one or more of abortion, interruption, replacement, retry, and isolation, and are taken based on predefined rules or algorithms. In some implementations, the process 500 may further include an operation 508, where in response to a decision to upload the one or more anomalies to the topology aggregation service, the client nodes may transmit the one or more anomalies to the topology aggregation service.

In some implementations, the process 500 may further comprise transmitting the uploaded anomalies from the topology aggregation service 102 to a conductor 104 in order to prioritize the uploaded anomalies based on one or more of severity levels, contagious levels, historical data, computational power associated with the uploaded anomalies, and transmitting proposed solutions to the uploaded anomaly are generated by an auto-remediate service. The auto-remediate service 106 may further comprise an auto-adaptive thresholds operation, the auto-adaptive thresholds operation detecting, in real-time or near real-time, whether one or more of the operations corresponding to the proposed solutions is available. This may ensure that the proposed solutions generated by the auto-remediate service are not just theoretically sound, but also practically feasible given the current state of the cloud service.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method for managing cloud service, comprising: detecting, at client nodes, anomalies based on a predetermined set of rules; determining, by the client nodes, whether to upload one or more anomalies of the detected anomalies to a topology aggregation service, wherein the determining is based at least in part on a severity level associated with the one or more anomalies and/or a service level associated with an entity that is experiencing the one or more anomalies; in response to a decision not to upload the one or more anomalies to the topology aggregation service, automatically selecting an action from a plurality of available actions, by the client nodes, wherein the action is selected based at least in part on the service level associated with the entity that is experiencing the one or more anomalies, and undertaking the selected action; and in response to a decision to upload the one or more anomalies to the topology aggregation service, transmitting the one or more anomalies to the topology aggregation service.

Example 2: The method of Example 1, wherein the available actions comprise one or more of abortion, interruption, replacement, retry, and isolation.

Example 3: The method of any of Examples 1-2, further comprising: transmitting the uploaded one or more anomalies from the topology aggregation service to a conductor; prioritizing, by the conductor, the uploaded one or more anomalies based on one or more of severity levels, contagious levels, historical data, computational power associated with the uploaded one or more anomalies; generating, by an auto-remediate service, proposed solutions to the uploaded one or more anomalies; and propagating the proposed solutions to the client nodes.

Example 4: The method of any of Examples 1-3, wherein the auto-remediate service further comprises an auto-adaptive thresholds operation, the auto-adaptive thresholds operation detecting, in real-time or near real-time, whether one or more of the operations corresponding to the proposed solutions is available.

Example 5: The method of any of Examples 1-4, wherein the client nodes further comprise an assembly estimated scaler, the assembly estimated scaler providing the available actions for the client nodes to deploy in a predetermined order.

Example 6: The method of any of Examples 1-5, wherein the client nodes further comprise an assembly estimated scaler, the assembly estimated scaler providing the available actions for the client nodes to deploy in a predetermined order.

Example 7: The method of any of Examples 1-6, wherein the determining of whether to upload the anomaly is based at least in part on a quality or cost associated with the service level.

Example 8: A system, comprising: a programmable processor; and a non-transient machine-readable medium storing instructions that, when executed by the processor, cause the at least one programmable processor to perform operations comprising: detecting, at client nodes, anomalies based on a predetermined set of rules; determining, by the client nodes, whether to upload one or more anomalies of the detected anomalies to a topology aggregation service, wherein the determining is based at least in part on a severity level associated with the one or more anomalies and/or a service level associated with an entity that is experiencing the one or more anomalies; in response to a decision not to upload the one or more anomalies to the topology aggregation service, automatically selecting an action from a plurality of available actions, by the client nodes, wherein the action is selected based at least in part on the service level associated with the entity that is experiencing the one or more anomalies, and undertaking the selected action; and in response to a decision to upload the one or more anomalies to the topology aggregation service, transmitting the one or more anomalies to the topology aggregation service.

Example 9: The system of Example 8, wherein the available actions comprise one or more of abortion, interruption, replacement, retry, and isolation.

Example 10: The system of any of Examples 8-9, further comprising: transmitting the uploaded one or more anomalies from the topology aggregation service to a conductor; prioritizing, by the conductor, the uploaded one or more anomalies based on one or more of severity levels, contagious levels, historical data, computational power associated with the uploaded one or more anomalies; generating, by an auto-remediate service, proposed solutions to the uploaded one or more anomalies; and propagating the proposed solutions to the client nodes.

Example 11: The system of any of Examples 8-10, wherein the auto-remediate service further comprises an auto-adaptive thresholds operation, the auto-adaptive thresholds operation detecting, in real-time or near real-time, whether one or more of the operations corresponding to the proposed solutions is available.

Example 12: The system of any of Examples 8-11, wherein the client nodes further comprise an assembly estimated scaler, the assembly estimated scaler providing the available actions for the client nodes to deploy in a predetermined order.

Example 13: The system of any of Examples 8-12, wherein the client nodes further comprise an assembly estimated scaler, the assembly estimated scaler providing the available actions for the client nodes to deploy in a predetermined order.

Example 14: The system of any of Examples 8-13, wherein the determining of whether to upload the anomaly is based at least in part on a quality or cost associated with the service level.

Example 15: A non-transitory computer-readable medium storing instructions, which when executed by at least one data processor, result in operations comprising detecting, at client nodes, anomalies based on a predetermined set of rules; determining, by the client nodes, whether to upload one or more anomalies of the detected anomalies to a topology aggregation service, wherein the determining is based at least in part on a severity level associated with the one or more anomalies and/or a service level associated with an entity that is experiencing the one or more anomalies; in response to a decision not to upload the one or more anomalies to the topology aggregation service, automatically selecting an action from a plurality of available actions, by the client nodes, wherein the action is selected based at least in part on the service level associated with the entity that is experiencing the one or more anomalies, and undertaking the selected action; and in response to a decision to upload the one or more anomalies to the topology aggregation service, transmitting the one or more anomalies to the topology aggregation service.

Example 16: The non-transitory computer-readable medium of Example 15, wherein the available actions comprise one or more of abortion, interruption, replacement, retry, and isolation.

Example 17: The non-transitory computer-readable medium of any of Examples 15-16, further comprising: transmitting the uploaded one or more anomalies from the topology aggregation service to a conductor; prioritizing, by the conductor, the uploaded one or more anomalies based on one or more of severity levels, contagious levels, historical data, computational power associated with the uploaded one or more anomalies; generating, by an auto-remediate service, proposed solutions to the uploaded one or more anomalies; and propagating the proposed solutions to the client nodes.

Example 18: The non-transitory computer-readable medium of any of Examples 15-17, wherein the auto-remediate service further comprises an auto-adaptive thresholds operation, the auto-adaptive thresholds operation detecting, in real-time or near real-time, whether one or more of the operations corresponding to the proposed solutions is available.

Example 19: The non-transitory computer-readable medium of any of Examples 15-18, wherein the client nodes further comprise an assembly estimated scaler, the assembly estimated scaler providing the available actions for the client nodes to deploy in a predetermined order.

Example 20: The non-transitory computer-readable medium of any of Examples 15-19, wherein the client nodes further comprise an assembly estimated scaler, the assembly estimated scaler providing the available actions for the client nodes to deploy in a predetermined order.

Figure 4:
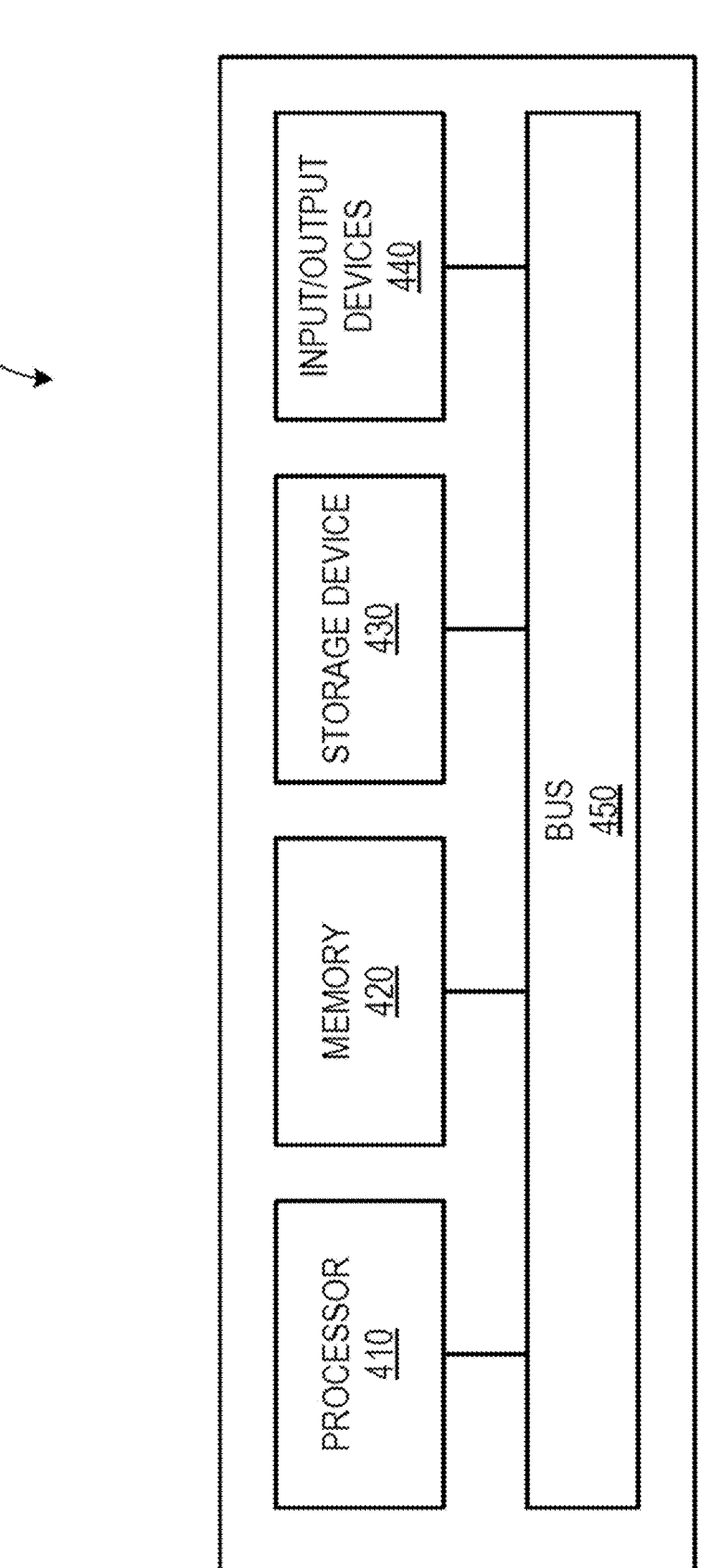
FIG. 4 depicts a block diagram illustrating a computing system consistent with implementations of the current subject matter.

FIG. 4 depicts a block diagram illustrating a computing system 400 consistent with implementations of the current subject matter. As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the Cloud micro-service topology service 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example a would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A method for managing a cloud service, comprising:
    detecting, at client nodes associated with the cloud service, anomalies in the cloud service based on a predetermined set of rules;
    determining, by the client nodes, whether to upload one or more anomalies of the detected anomalies to a topology aggregation service configured to collect information about a topology of the cloud service and provide information regarding a structure and an operation of the cloud service based on the information about the topology of the cloud service, wherein the determining is based at least in part on a severity level associated with the one or more anomalies and/or a service level associated with an entity that is experiencing the one or more anomalies;
    in response to a decision not to upload the one or more anomalies to the topology aggregation service,
        generating, by the client nodes, a list of available actions that is ordered based on an expected effectiveness of each action in mitigating an impact of the one or more anomalies on the cloud service, the available actions comprising one or more of aborting a task associated with the one or more anomalies, interrupting a service associated with the one or more anomalies, retrying an operation associated with the one or more anomalies, and isolating a problem area associated with the one or more anomalies, and
        executing, by the client nodes, an action selected from the list of available actions to mitigate the impact of the one or more anomalies on the cloud service, wherein the action is selected based at least in part on the service level associated with the entity that is experiencing the one or more anomalies; and
    in response to a decision to upload the one or more anomalies to the topology aggregation service,
        transmitting, by the client nodes, the one or more anomalies to the topology aggregation service.

2. The method of claim 1, wherein the action is executed by the client nodes to mitigate the impact of the one or more anomalies on the cloud service without uploading the one or more anomalies to the topology aggregation service.

3. The method of claim 1, further comprising:
    transmitting the uploaded one or more anomalies from the topology aggregation service to a conductor;
    prioritizing, by the conductor, the uploaded one or more anomalies based on one or more of severity levels, contagious levels, historical data, computational power associated with the uploaded one or more anomalies;
    generating, by an auto-remediate service, proposed solutions to the uploaded one or more anomalies; and
    propagating the proposed solutions to the client nodes.

4. The method of claim 3, wherein the auto-remediate service further comprises an auto-adaptive thresholds operation, the auto-adaptive thresholds operation detecting, in real-time or near real-time, whether one or more of the operations corresponding to the proposed solutions is available.

5. The method of claim 1, wherein the list of available actions is ordered by the client nodes based further on a potential disruption caused by each action to the cloud service.

6. The method of claim 1, wherein the topology aggregation service comprises an indexed assembly triplet, the indexed assembly triplet comprising an error severity level, an original service associated with the error, and a potential operation list associated with the anomaly.

7. The method of claim 1, wherein the determining of whether to upload the one or more anomalies is based at least in part on a quality or cost associated with the service level.

8. A system, comprising:

a programmable processor; and a non-transient machine-readable medium storing instructions that, when executed by the processor, cause the at least one programmable processor to perform operations comprising:

detecting, at client nodes associated with a cloud service, anomalies in the cloud service based on a predetermined set of rules;

determining, by the client nodes, whether to upload one or more anomalies of the detected anomalies to a topology aggregation service configured to collect information about a topology of the cloud service and provide information regarding a structure and an operation of the cloud service based on the information about the topology of the cloud service, wherein the determining is based at least in part on a severity level associated with the one or more anomalies and/or a service level associated with an entity that is experiencing the one or more anomalies;

in response to a decision not to upload the one or more anomalies to the topology aggregation service, generating, by the client nodes, a list of available actions that is ordered based on an expected effectiveness of each action in mitigating an impact of the one or more anomalies on the cloud service, the available actions comprising one or more of aborting a task associated with the one or more anomalies, interrupting a service associated with the one or more anomalies, retrying an operation associated with the one or more anomalies, and isolating a problem area associated with the one or more anomalies, and executing, by the client nodes, an action selected from the list of available actions to mitigate the impact of the one or more anomalies on the cloud service, wherein the action is selected based at least in part on the service level associated with the entity that is experiencing the one or more anomalies; and in response to a decision to upload the one or more anomalies to the topology aggregation service, transmitting, by the client nodes, the one or more anomalies to the topology aggregation service.

9. The system of claim 8, wherein the action is executed by the client nodes to mitigate the impact of the one or more anomalies on the cloud service without uploading the one or more anomalies to the topology aggregation service.

10. The system of claim 8, wherein the operations further comprising:

transmitting the uploaded one or more anomalies from the topology aggregation service to a conductor;

prioritizing, by the conductor, the uploaded one or more anomalies based on one or more of severity levels, contagious levels, historical data, computational power associated with the uploaded one or more anomalies;

generating, by an auto-remediate service, proposed solutions to the uploaded one or more anomalies; and propagating the proposed solutions to the client nodes.

11. The system of claim 10, wherein the auto-remediate service further comprises an auto-adaptive thresholds operation, the auto-adaptive thresholds operation detecting, in real-time or near real-time, whether one or more of the operations corresponding to the proposed solutions is available.

12. The system of claim 8, wherein the list of available actions is ordered by the client nodes based further on a potential disruption caused by each action to the cloud service.

13. The system of claim 8, wherein the topology aggregation service comprises an indexed assembly triplet, the indexed assembly triplet comprising an error severity level, an original service associated with the error, and a potential operation list associated with the anomaly.

14. The system of claim 8, wherein the determining of whether to upload the one or more anomalies is based at least in part on a quality or cost associated with the service level.

15. A non-transitory computer-readable medium storing instructions, which when executed by at least one data processor, result in operations comprising:

detecting, at client nodes associated with a cloud service, anomalies in the cloud service based on a predetermined set of rules;

determining, by the client nodes, whether to upload one or more anomalies of the detected anomalies to a topology aggregation service configured to collect information about a topology of the cloud service and provide information regarding a structure and an operation of the cloud service based on the information about the topology of the cloud service, wherein the determining is based at least in part on a severity level associated with the one or more anomalies and/or a service level associated with an entity that is experiencing the one or more anomalies;

in response to a decision not to upload the one or more anomalies to the topology aggregation service, generating, by the client nodes, a list of available actions that is ordered based on an expected effectiveness of each action in mitigating an impact of the one or more anomalies on the cloud service, the available actions comprising one or more of aborting a task associated with the one or more anomalies, interrupting a service associated with the one or more anomalies, retrying an operation associated with the one or more anomalies, and isolating a problem area associated with the one or more anomalies, and executing, by the client nodes, an action selected from the list of available actions to mitigate the impact of the one or more anomalies on the cloud service, wherein the action is selected based at least in part on the service level associated with the entity that is experiencing the one or more anomalies; and in response to a decision to upload the one or more anomalies to the topology aggregation service, transmitting, by the client nodes, the one or more anomalies to the topology aggregation service.

16. The non-transitory computer-readable medium of claim 15, wherein the action is executed by the client nodes to mitigate the impact of the one or more anomalies on the cloud service without uploading the one or more anomalies to the topology aggregation service.

17. The non-transitory computer-readable medium of claim 15, wherein the operations further comprise:

transmitting the uploaded one or more anomalies from the topology aggregation service to a conductor;

prioritizing, by the conductor, the uploaded one or more anomalies based on one or more of severity levels, contagious levels, historical data, computational power associated with the uploaded one or more anomalies;

generating, by an auto-remediate service, proposed solutions to the uploaded one or more anomalies; and propagating the proposed solutions to the client nodes.

18. The non-transitory computer-readable medium of claim 17, wherein the auto-remediate service further comprises an auto-adaptive thresholds operation, the auto-adaptive thresholds operation detecting, in real-time or near real-time, whether one or more of the operations corresponding to the proposed solutions is available.

19. The non-transitory computer-readable medium of claim 15, wherein the list of available actions is ordered by the client nodes based further on a potential disruption caused by each action to the cloud service.

20. The non-transitory computer-readable medium of claim 15, wherein the topology aggregation service comprises an indexed assembly triplet, the indexed assembly triplet comprising an error severity level, an original service associated with the error, and a potential operation list associated with the anomaly.

* * * * *